United States Patent

[11] 3,601,478

| | | |
|---|---|---|
| [72] | Inventor | Robert H. Ramp<br>Pittsford, N.Y. |
| [21] | Appl. No. | 797,984 |
| [22] | Filed | Feb. 10, 1969 |
| [45] | Patented | Aug. 24, 1971 |
| [73] | Assignee | Bausch & Lomb Incorporated<br>Rochester, N.Y. |

[54] REINFORCED SPECTACLE FRAME
1 Claim, 4 Drawing Figs.

[52] U.S. Cl. .................................................. 351/89,
351/51, 351/129
[51] Int. Cl. .................................................. G02c 1/00
[50] Field of Search........................................... 351/89,
102, 117, 129, 51, 52, 60, 85, 89, 83, 103, 109

[56] References Cited
UNITED STATES PATENTS

| | | | |
|---|---|---|---|
| 2,243,770 | 5/1941 | Nerney.......................... | 351/129 |
| 2,997,917 | 8/1961 | Baer............................. | 351/89 X |
| 2,609,278 | 9/1952 | Eyles............................ | 351/51 |

FOREIGN PATENTS

| | | | |
|---|---|---|---|
| 484,441 | 1953 | Italy ............................ | 351/89 |
| 1,428,549 | 1/1966 | France ......................... | 351/83 |

*Primary Examiner*—David Schonberg
*Assistant Examiner*—John W. Leonard
*Attorney*—Frank C. Parker ABSTRACT: A spectacle frame having a brow bar is provided with a recess into which a reinforcing member is secured. The spectacles are further characterized in that by partially exposing the reinforcing member a decorative effect is also achieved.

PATENTED AUG 24 1971
3,601,478
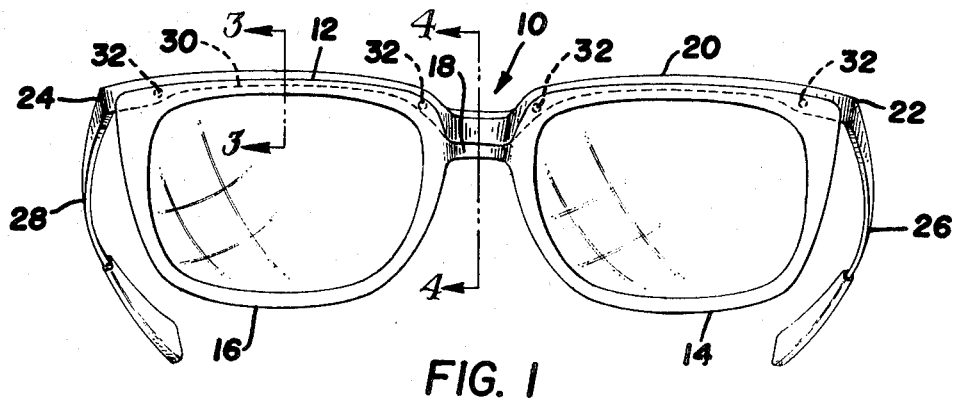
FIG. 1
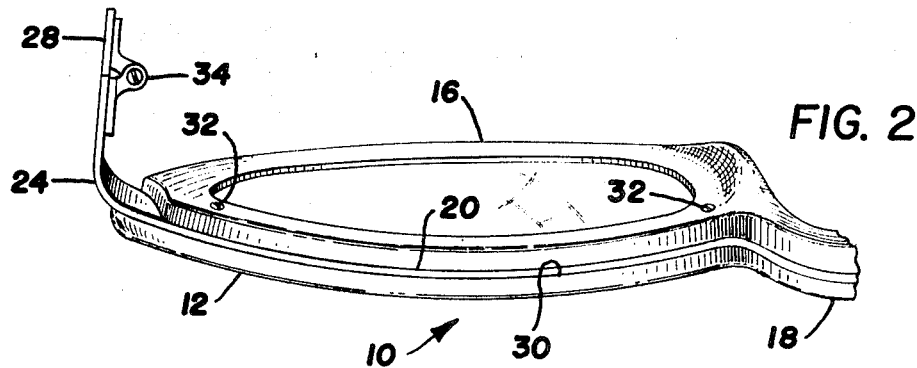
FIG. 2
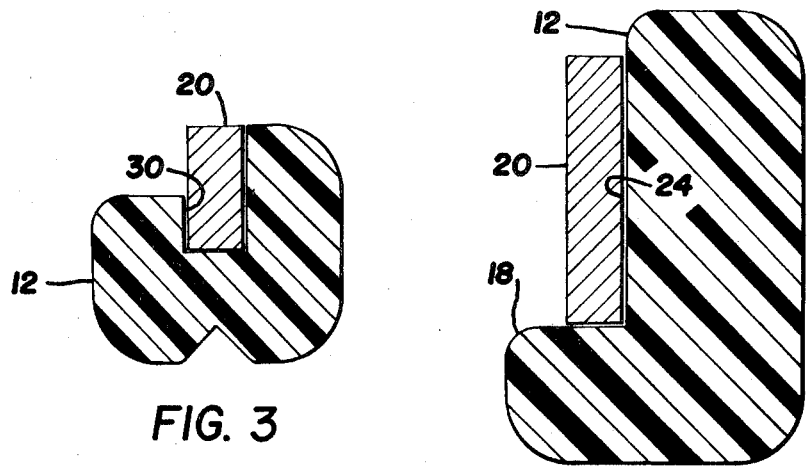
FIG. 3
FIG. 4
ROBERT H. RAMP
INVENTOR.
BY *Frank C. Parker*
ATTORNEY

3,601,478

REINFORCED SPECTACLE FRAME

BACKGROUND OF THE INVENTION

The invention pertains to synthetic plastic spectacle frames and more particularly to strengthened synthetic plastic spectacle frames.

Reinforced synthetic plastic spectacle frames, such as disclosed in U.S. Pat. No. 2.997,917, are known. This patent shows a reinforced synthetic plastic spectacle frame having a metal member embedded wholly within the rear portion of the brow bar. In order to achieve this result a precision groove is milled in the rear portion of the brow bar, a reinforcing member seated in said groove, and a separate plastic member of similar configuration to that of the brow bar and disposed over the reinforcing member is heat sealed or bonded to the rear portion of the brow bar. While this construction is acceptable it has some disadvantages. In the known prior art it is necessary to hold close manufacturing tolerances in order to assure proper mating of the assembled articles. It is also necessary to be particularly cautious when heat sealing the articles together to avoid warpage in the spectacle frame.

SUMMARY OF THE INVENTION

This invention provides a spectacle frame of simple, yet superior construction. I have found that by providing a reinforcing member which is partially recessed into the brow bar portion of a spectacle frame a substantially reinforced frame is provided. The partially recessed member not only provides a structurally reinforced frame as noted but also at the same time produces a spectacle frame with a very pleasing decorative effect. By selecting the combination reinforcing members, color, shape and size, for a given basic frame shape the spectacle manufacturer can provide a multitude of decorative effects. This provides for economy for the spectacle manufacturer and the dispenser of spectacle frames.

I have also found that in order to achieve the reinforcing of the spectacle frame it is unnecessary to heat seal the reinforcing member to the spectacle frame. Using removable fasteners or cement, a reinforced spectacle frame can be manufactured without the use of heat and the warpage problems associated therewith.

BRIEF DESCRIPTION OF THE DRAWINGS

FIG. 1 is a front view of a pair of spectacles showing the several related parts of one embodiment of the present invention;

FIG. 2 is a top plan view, partly broken away and on an enlarged scale as viewed in FIG. 1;

FIG. 3 is an enlarged cross-sectional view taken along line 3—3 of FIG. 1; and

FIG. 4 is an enlarged cross-sectional view taken along line 4—4 of FIG. 1.

DESCRIPTION OF THE PREFERRED EMBODIMENTS

Referring now to FIG. 1, there is shown a one-piece spectacle frame 10 having a brow bar 12 extending from one temple portion to the other and lens rims 14, 16 integrally depending therefrom. A bridge member 18, which is part of the brow bar 12, adjoins lens rims 14, 16 at their top portions. A one-piece reinforcing member 20 is provided having a generally rectangular cross-sectional configuration throughout its length with end portions 22, 24, which may curve rearwardly to accept temples 26, 28. The reinforcing member 20 is shaped to conform to the configuration of the brow bar 12 and is partially disposed within a channel or recess 30 milled into the top portion of the brow bar 12.

In the assembled form as shown in FIGS. 1 and 2, the reinforcing member 20 is secured in the recess 30, in the brow bar 12 by fasteners 32. The temples 26, 28 have temple hinges 34, 34 secured to their forward ends, one of which is best shown in FIG. 2.

FIG. 3 shows the reinforcing member 20 in the partially exposed position it assumes in the area above the lens cells 14, 16 in brow bar 12, and FIG. 4 shows the reinforcing member 20 in its wholly exposed position in the bridge area 18 of the brow bar 12. With the reinforcing member 20 disposed as shown in the drawings it provides a reinforced spectacle front having a pleasing decorative appearance.

It is obvious that changes and modifications may be made in the invention without departing from the spirit or scope thereof.

What I claim is:

1. A spectacle frame comprising:
    a plastic spectacle front member having a unitary brow bar and a pair of lens rims depending therefrom;
    said brow bar having a longitudinal recess in its upper surface extending the length of said brow bar and extending downwardly toward both of said lens rims;
    an elongated one-piece metal member partially disposed within said recess for reinforcing said brow bar and simultaneously providing a decorative effect for said spectacle front; and
    means for securing said one-piece member to said brow bar.